United States Patent
Zhang et al.

(10) Patent No.: US 12,443,562 B2
(45) Date of Patent: Oct. 14, 2025

(54) DATA PROCESSING METHOD AND RELATED APPARATUS

(71) Applicant: HUAWEI TECHNOLOGIES CO., LTD., Guangdong (CN)

(72) Inventors: Lei Zhang, Chengdu (CN); Jun Cao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/390,917

(22) Filed: Dec. 20, 2023

(65) Prior Publication Data

US 2024/0119029 A1    Apr. 11, 2024

Related U.S. Application Data

(63) Continuation of application No. PCT/CN2022/086079, filed on Apr. 11, 2022.

(30) Foreign Application Priority Data

Jun. 25, 2021  (CN) .......................... 202110713326.9
Sep. 17, 2021  (CN) .......................... 202111095506.1

(51) Int. Cl.
*G06F 16/16*  (2019.01)
*G06F 16/11*  (2019.01)

(52) U.S. Cl.
CPC ............ *G06F 16/164* (2019.01); *G06F 16/11* (2019.01)

(58) Field of Classification Search
CPC ................................ G06F 16/164; G06F 16/11
See application file for complete search history.

(56) References Cited

U.S. PATENT DOCUMENTS

| | | | | |
|---|---|---|---|---|
| 5,495,607 A | * | 2/1996 | Pisello .................. | G06F 16/168 707/812 |
| 7,577,689 B1 | * | 8/2009 | Masinter .............. | G06F 11/1464 |
| 7,653,612 B1 | * | 1/2010 | Veeraswamy ....... | G06F 16/1774 707/999.001 |
| 8,756,249 B1 | * | 6/2014 | Wallace ................ | G06F 16/148 707/688 |

(Continued)

FOREIGN PATENT DOCUMENTS

| | | |
|---|---|---|
| CN | 110462578 A | 11/2019 |
| CN | 112612411 A | 4/2021 |

OTHER PUBLICATIONS

Extended European Search Report in European Appln. No. 22827130. 0, mailed on Sep. 17, 2024, 8 pages.

*Primary Examiner* — Mark E Hershley
(74) *Attorney, Agent, or Firm* — Fish & Richardson P.C.

(57) ABSTRACT

This disclosure provides a data processing method. The method includes: A backup server receives a metadata obtaining command, where the metadata obtaining command is used to obtain file system metadata in a first format, and the command includes an identifier of a to-be-read target directory. The backup server obtains, from a metadata storage area of an archive storage based on the identifier of the target directory, file system metadata that is in a second format and that corresponds to the target directory, converts the file system metadata that is in the second format and that corresponds to the target directory into file system metadata that is in the first format and that corresponds to the target directory, and returns the file system metadata.

20 Claims, 11 Drawing Sheets

(56) References Cited

U.S. PATENT DOCUMENTS

| | | | |
|---|---|---|---|
| 8,935,215 B1* | 1/2015 | Sharma | G06F 11/1464 707/674 |
| 9,026,499 B1* | 5/2015 | Rajimwale | G06F 16/288 707/674 |
| 9,355,120 B1* | 5/2016 | Slik | H04L 67/1097 |
| 9,824,095 B1* | 11/2017 | Taylor | G06F 16/11 |
| 9,990,253 B1* | 6/2018 | Rajimwale | G06F 11/1435 |
| 10,216,449 B1* | 2/2019 | Li | G06F 11/1451 |
| 10,620,883 B1* | 4/2020 | Cai | G06F 3/0647 |
| 11,347,707 B2* | 5/2022 | Dornemann | G06F 16/2272 |
| 11,467,753 B2* | 10/2022 | Kilaru | G06F 3/0659 |
| 2012/0023233 A1* | 1/2012 | Okamoto | G06F 9/45558 709/226 |
| 2013/0311429 A1* | 11/2013 | Agetsuma | G06F 11/1451 707/640 |
| 2014/0074787 A1* | 3/2014 | Berman | G06F 11/1469 707/639 |
| 2014/0074790 A1 | 3/2014 | Berman et al. | |
| 2015/0026147 A1* | 1/2015 | Jonsson | H04N 21/8455 707/706 |
| 2015/0269032 A1* | 9/2015 | Muthyala | G06F 16/178 707/649 |
| 2016/0034481 A1* | 2/2016 | Kumarasamy | G06F 16/128 707/639 |
| 2016/0210342 A1* | 7/2016 | Vallabhaneni | G06F 11/3034 |
| 2017/0262350 A1* | 9/2017 | Dornemann | G06F 16/172 |
| 2018/0143880 A1* | 5/2018 | Dornemann | G06F 11/2048 |
| 2018/0239867 A1* | 8/2018 | Kopylov | G06V 10/44 |
| 2018/0285205 A1* | 10/2018 | Mehta | G06F 11/1456 |
| 2018/0285207 A1* | 10/2018 | Mehta | G06F 11/302 |
| 2019/0179714 A1* | 6/2019 | Karthikeyan | G06F 3/065 |
| 2019/0286726 A1* | 9/2019 | Labian | G06F 16/2272 |
| 2020/0042395 A1* | 2/2020 | Chu | G06F 16/24552 |
| 2020/0201827 A1* | 6/2020 | Chacko | G06F 16/1824 |
| 2021/0037112 A1* | 2/2021 | Ankireddypalle | H04L 67/5683 |
| 2021/0255771 A1* | 8/2021 | Kilaru | G06F 3/0659 |
| 2021/0286684 A1* | 9/2021 | Nara | G06F 11/1448 |
| 2022/0245034 A1* | 8/2022 | Nara | G06F 11/1469 |
| 2024/0119029 A1* | 4/2024 | Zhang | G06F 16/11 |

* cited by examiner

DATA PROCESSING METHOD AND RELATED APPARATUS

CROSS-REFERENCE TO RELATED APPLICATIONS

This application is a continuation of International Application No. PCT/CN2022/086079, filed on Apr. 11, 2022, which claims priority to Chinese Patent Application No. 202110713326.9, filed on Jun. 25, 2021, and Chinese Patent Application No. 202111095506.1, filed on Sep. 17, 2021. All of the aforementioned patent applications are hereby incorporated by reference in their entirety.

TECHNICAL FIELD

This application relates to the field of storage technologies, and in particular, to a data processing method and apparatus, a backup server, a computer-readable storage medium, and a computer program product.

BACKGROUND

During industrial production, backup storage is generally performed on data in a production environment to ensure production security, so that when the production environment is abnormal, production can be restored based on backup data. The backup data may further be mounted to a development host, a test host, or an analysis host for development, test, or analysis.

A high-performance storage medium is generally used for backup storage. In a process of performing backup storage on the data in the production environment, archive storage may further be performed on the backup data to reduce costs. The archive storage refers to migrating the data to a low-cost and large-capacity storage medium. A storage format of the data in the archive storage generally changes, for example, changes from a file storage format the same as a file storage format in the production environment to an object-based storage format different from the file storage format in the production environment.

When the data in the archive storage is mounted to the development host, the test host, or the analysis host, all data stored during an archive storage operation needs to be restored to a storage format the same as the storage format in the production environment, to obtain a corresponding file system, and further mount the data based on the file system. This is time consuming and occupies a large amount of resources, for example, a large amount of computing resources, storage resources, and network resources, and consequently cannot meet service requirements.

SUMMARY

This application provides a data processing method. According to the method, metadata is stored in a centralized manner in a metadata storage area of an archive storage, so that corresponding metadata can be directly obtained from the metadata storage area during data mounting, and there is no need to obtain all data stored during an archive storage operation and to restore the data to a format the same as a format in a production environment. This shortens mounting time and reduces resource occupation. This application further provides an apparatus corresponding to the method, a backup server, a computer-readable storage medium, and a computer program product.

According to a first aspect, this application provides a data processing method, and the method may be performed by a backup server. Specifically, the backup server receives a metadata obtaining command, where the metadata obtaining command is used to obtain file system metadata in a first format, and the metadata obtaining command includes an identifier of a to-be-read target directory. Then, the backup server obtains, from a metadata storage area of an archive storage based on the identifier of the target directory, file system metadata that is in a second format and that corresponds to the target directory. Subsequently, the backup server converts the file system metadata that is in the second format and that corresponds to the target directory into file system metadata that is in the first format and that corresponds to the target directory, and returns the file system metadata that is in the first format and that corresponds to the target directory. The file system metadata includes a subdirectory list and/or a file list of the target directory.

In this method, the metadata storage area of the archive storage stores metadata in a centralized manner. Different from a conventional archive storage in which both data and metadata are stored in an object, in this method, metadata including the file system metadata is stored separately from the data. In this way, when the metadata such as a directory needs to be read from the archive storage, the file system metadata that is in the second format and that corresponds to the target directory may be directly obtained from the metadata storage area of the archive storage based on the identifier of the target directory, and the format is converted into the first format. There is no need to obtain all data stored during an archive storage operation and to restore the data to a storage format the same as a storage format in a production environment. This greatly shortens mounting time, implements live mounting, and meets service requirements. In addition, there is no need to create complete space in a backup storage to restore all data in the archive storage, thereby reducing costs.

In some possible implementations, the backup server further receives a first data read command used to read first data. The first data belongs to a first target file in the target directory, and the first data read command includes an identifier of the first target file and an address of the first data. Correspondingly, the backup server obtains, from the archive storage, a correspondence between the first data and a plurality of container objects in the archive storage based on the identifier of the first target file and the address of the first data. The plurality of container objects each store partial data of the first data. The backup server obtains corresponding data from the plurality of container objects based on the correspondence, obtains the first data based on a plurality of pieces of data obtained from the plurality of container objects, and returns the first data.

Similar to reading the metadata, because file mapping relationship metadata is stored in a centralized manner in the metadata storage area of the archive storage, and the file mapping relationship metadata is used to describe a correspondence between partial data of a file and a container object that stores the partial data, based on this, the backup server may directly obtain the correspondence based on an identifier of the file in which to-be-read data is located and an address of the data in the file, separately obtain the partial data of the first data from the plurality of container objects based on the correspondence, and combine the partial data to obtain the first data. There is no need to obtain all data stored during an archive storage operation and to restore the data. This implements live mounting, reduces overheads of data transmission and storage, and reduces costs.

In some possible implementations, the backup server may further write the first data into a backup storage, to perform persistent storage on the first data. In an aspect, this can avoid loss of the first data due to a power failure. In another aspect, acceleration can be performed when the first data is accessed next time.

In some possible implementations, the backup server further receives a second data read command used to read the first data, and the backup server may obtain the first data from the backup storage, and return the first data. In this way, the first data can be quickly obtained from the backup storage, thereby implementing access acceleration.

In some possible implementations, the backup server further receives a data write command used to write second data. The second data is update data of a second target file in the target directory, and the backup server writes the second data into a backup storage according to the data write command. In an aspect, subsequent access to the second data may be accelerated. In another aspect, damage to data in the archive storage may be avoided.

In some possible implementations, the backup server may further obtain, from the metadata storage area of the archive storage, file system metadata of the second target file and a correspondence between the second target file and a plurality of container objects that store the second target file, and update, based on the second data, the file system metadata of the second target file and the correspondence between the second target file and the plurality of container objects that store the second target file. Updated file system metadata of the second target file and an updated correspondence between the second target file and the plurality of container objects that store the second target file are written into the backup storage. In this way, subsequent access to the target file may be accelerated.

In some possible implementations, the backup server and the backup storage are disposed in an integrated manner, and the archive storage and the backup server are disposed separately. The backup storage and the backup server are disposed in the integrated manner, so that network resource overheads can be reduced and costs can be reduced.

In some other possible implementations, the backup storage and the backup server may alternatively be disposed separately. For example, the backup storage may be connected to the backup server through a network. This can reduce a size of the backup server, and improve an integration scale of the backup server.

In some possible implementations, the first format is file storage or block storage, and the second format is object-based storage. Different service requirements can be met by supporting different storage formats.

According to a second aspect, this application provides a data processing apparatus, where the apparatus includes a communication module and a conversion module.

The communication module is configured to receive a metadata obtaining command, where the metadata obtaining command is used to obtain file system metadata in a first format, and the metadata obtaining command includes an identifier of a to-be-read target directory.

The communication module is further configured to obtain, from a metadata storage area of an archive storage based on the identifier of the target directory, file system metadata that is in a second format and that corresponds to the target directory, where the metadata storage area stores metadata in a centralized manner.

The conversion module is configured to convert the file system metadata that is in the second format and that corresponds to the target directory into file system metadata that is in the first format and that corresponds to the target directory.

The communication module is further configured to return the file system metadata that is in the first format and that corresponds to the target directory, where the file system metadata includes a subdirectory list and/or a file list of the target directory.

In some possible implementations, the communication module is further configured to:
receive a first data read command used to read first data, where the first data belongs to a first target file in the target directory, and the first data read command includes an identifier of the first target file and an address of the first data;
obtain, from the archive storage, a correspondence between the first data and a plurality of container objects in the archive storage based on the identifier of the first target file and the address of the first data, where the plurality of container objects each store partial data of the first data; and
obtain corresponding data from the plurality of container objects based on the correspondence, obtain the first data based on a plurality of pieces of data obtained from the plurality of container objects, and return the first data.

In some possible implementations, the communication module is further configured to:
write the first data into a backup storage.

In some possible implementations, the communication module is further configured to:
receive a second data read command used to read the first data;
obtain the first data from the backup storage; and
return the first data.

In some possible implementations, the communication module is further configured to:
receive a data write command used to write second data, where the second data is update data of a second target file in the target directory; and
write the second data into the backup storage according to the data write command.

In some possible implementations, the communication module is further configured to:
obtain, from the metadata storage area of the archive storage, file system metadata of the second target file and a correspondence between the second target file and a plurality of container objects that store the second target file;
the apparatus further includes:
an updating module, configured to update, based on the second data, the file system metadata of the second target file and the correspondence between the second target file and the plurality of container objects that store the second target file; and
the communication module is further configured to:
write updated file system metadata of the second target file and an updated correspondence between the second target file and the plurality of container objects that store the second target file into the backup storage.

In some possible implementations, the backup server and the backup storage are disposed in an integrated manner, and the backup server and the archive storage are disposed separately.

In some possible implementations, the first format is block storage or file storage, and the second format is object-based storage.

According to a third aspect, this application provides a backup server, where the backup server includes a processor and a storage. The processor and the storage communicate with each other. The processor is configured to execute instructions stored in the storage, so that the backup server performs the data processing method according to the first aspect or any one of the implementations of the first aspect.

According to a fourth aspect, this application provides a computer-readable storage medium, where the computer-readable storage medium stores instructions. The instructions instruct a backup server to perform the data processing method according to the first aspect or any one of the implementations of the first aspect.

According to a fifth aspect, this application provides a computer program product including instructions. When the computer program product runs on a backup server, the backup server is enabled to perform the data processing method according to the first aspect or any one of the implementations of the first aspect.

In this application, based on the implementations according to the foregoing aspects, the implementations may be further combined to provide more implementations.

BRIEF DESCRIPTION OF DRAWINGS

To describe the technical methods in embodiments of this application more clearly, the following briefly describes the accompanying drawings that need to be used in the embodiments.

DESCRIPTION OF EMBODIMENTS

In the specification, claims, and accompanying drawings of this application, the terms "first", "second", and so on are intended to distinguish between similar objects but do not necessarily indicate a specific order or sequence. It should be understood that the terms used in such a manner are interchangeable in proper circumstances, and this is merely a distinguishing manner used when objects with a same attribute are described in the embodiments of this application.

For ease of understanding, some technical terms in this application are first explained.

Figure 1:
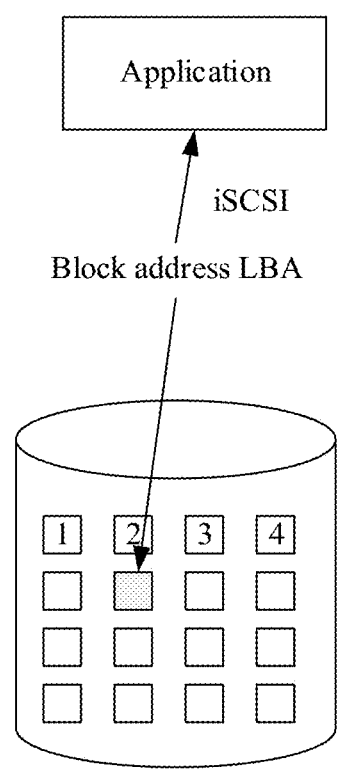
FIG. 1 is a schematic diagram of block storage according to an embodiment of this application.

Block storage is also referred to as block-level (block-level) data storage, and is a storage format in which data is split into blocks (blocks) and each block is stored separately. For the block-level data storage, a data organization mode and structure are not considered in a medium. As shown in FIG. 1, all data is divided into blocks based on a fixed size, and each block is assigned with a number used for addressing.

A hard disk drive is used as an example. One block is a sector, and each sector is 512 bytes or 4 KB. In some embodiments, a hard disk performs addressing by using numbers formed by Cylinder-Head-Sectors (CHSs). In some other embodiments, a hard disk performs addressing by using a logical block number (LBA). Therefore, the hard disk is also called a block device. Certainly, in addition to the hard disk, there are other block devices, such as floppy disks of different specifications, CD-ROMs of various specifications, and tapes.

The block device may communicate with a computing device (for example, an application server) according to an Internet small computer system interface (iSCSI) protocol. In some embodiments, the block device may alternatively communicate with the computing device according to another protocol.

File storage is also referred to as file-level (file-level) data storage, and can be implemented via a file system. The file system is a structured data file storage and organization form. All data in a computer is 0 and 1. A series of combinations of 0 and 1 stored on a hardware medium cannot be identified and managed. Therefore, the computer organizes the data by using a concept of "files", for example, organizes, based on structures required by different applications, data used for a same purpose into different types of files. Generally, different suffixes indicate different types, and each file is named for ease of understanding and memorizing. When there are a large quantity of files, the files can be grouped in a specific manner, and each group of files is placed in a same directory (namely, a folder). In addition to the files, a directory may include a lower-level directory (that is, a subdirectory or a subfolder). All the files and directories form a tree structure. The tree structure has a special name: file system. There are many types of file systems, such as FAT, FAT32, and NTFS in Windows, EXT2, EXT3, EXT4, XFS, and BtrFS in Linux, and the like.

To facilitate search, level-by-level descending from a root node to the files, names of a directory, a subdirectory, and a file are combined with special characters (for example, "\" is used in Windows or DOS and "/" is used in a Unix-like system), and such a string of characters is called a file path, for example, "/etc/systemd/system.conf" in Linux or "C:\Windows\System32 \taskmgr.exe" in Windows. A path is a unique identifier for accessing a specific file. For example, D:\data\file.exe in Windows is a path of a file, which indicates the file.exe file in a data directory in partition D.

Figure 2:
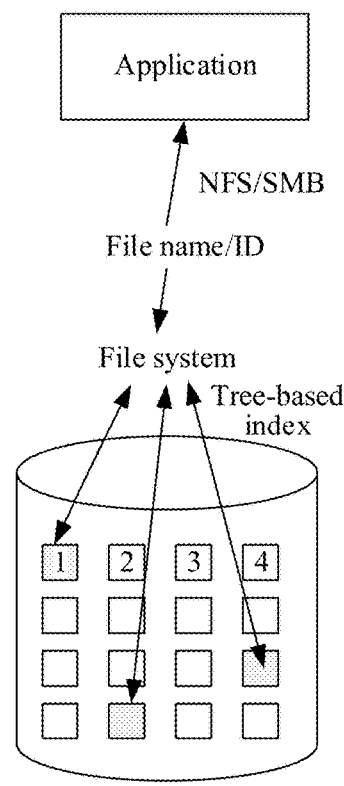
FIG. 2 is a schematic diagram of file storage according to an embodiment of this application.

As shown in FIG. 2, a file system is established on a block device. The file system not only records a file path, but also records blocks that form a file, and blocks that record directory/subdirectory information. Different file systems have different organizational structures. To facilitate management, a block device such as a hard disk may be generally divided into a plurality of logic unit number devices (LUN devices), that is, hard disk partitions (Partitions). Conversely, capacity and performance of a single medium are limited. A plurality of physical block devices can be combined into a logic unit number device by using specific technologies, such as various levels of redundant arrays of independent disks (RAIDs) and just a bunch of disks (JBODs). The file system may alternatively be built on these logical unit number devices. In any case, an application on an application server does not need to consider a specific location of a to-be-accessed file on an underlying block device, and needs to send only a file name/ID of the file to the file system, and the file system finds a file path based on the file name/ID.

A common file access protocol is a network file system (NFS), a common Internet file system (CIFS), or a server message block (SMB). This is not limited in this embodiment.

Figure 3:
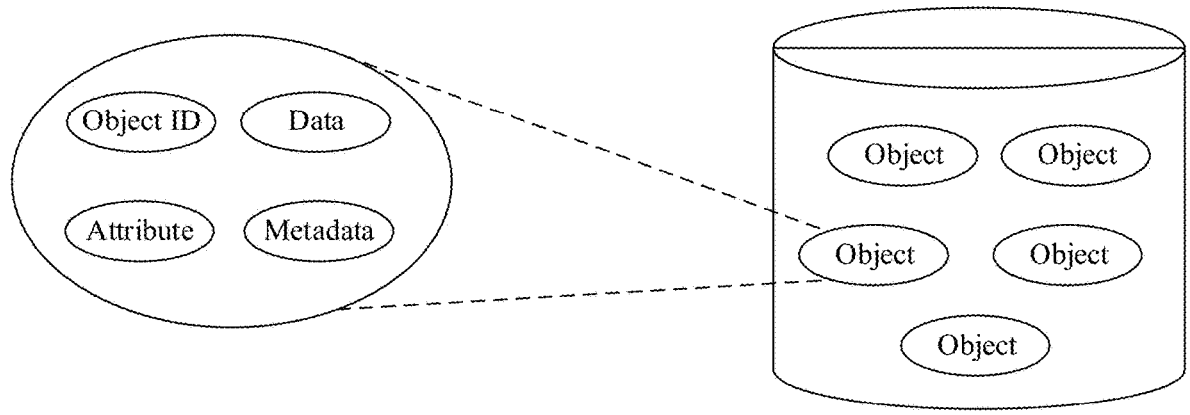
FIG. 3 is a schematic diagram of object-based storage according to an embodiment of this application.

Object-based storage is also referred to as object-level data storage, and may provide a scalable, self-managed, protected, and shared storage solution for unstructured data such as movies, office documents, and images. The object-based storage uses flat address space to store data. There is no hierarchy of directories and files in the address space. Therefore, an object-based storage system can store a large quantity of objects. As shown in FIG. 3, an object may include user data, related metadata (such as a size, a date, and an owner), and other attributes (such as an access characteristic) of the data. Each object is identified by a unique ID, which is called an object ID. Object IDs are generated by using dedicated algorithms (such as data hash values) to ensure that each object ID is unique.

Mounting is a process in which an operating system enables a user to access files and directories on a storage device (such as a hard disk, an optic video disc, or a shared resource) via a file system of a computer. The storage device may be a backup storage. The backup storage generally uses a storage format the same as a storage format in a production environment (for example, an environment where an application is released) to back up data in the production environment, so that production can be restored based on the backup data when the production environment is abnormal. In addition, data in the backup storage may further be mounted to a development host, a test host, or an analysis host for development, test, or analysis. Because the storage format of the data in the backup storage is the same as the storage format of data in the production environment, the data in the backup storage can be directly shared to the host through network-attached storage, to implement live mounting of the backup storage.

In practical application, archive storage may be performed on the backup data in the backup storage to reduce costs. The archive storage refers to migrating the data to a low-cost and large-capacity storage medium. A storage format of data in an archive storage generally changes. For example, a file storage format the same as a file storage format in a production environment changes to an object-based storage format that is different from the file storage format in the production environment.

When a user needs to mount data in the archive storage to the development host, the test host, or the analysis host, all data stored during an archive storage operation needs to be restored to a storage format the same as a storage format in the production environment, to obtain a corresponding file system and mount data based on the file system. This is time consuming and occupies a large amount of resources, for example, a large amount of computing resources, storage resources, and network resources, and consequently cannot meet service requirements.

In view of this, an embodiment of this application provides a data processing method. The method may be applied to a data processing system shown in FIG. 4. The data processing system 400 includes a backup server 402 and an archive storage 404. In addition, the data processing system 400 further includes a backup storage 406.

Different from a conventional archive storage in which both data and metadata are stored in an object, in the archive storage 404 in this embodiment of this application, a metadata storage area and a data storage area are disposed. The metadata storage area stores the metadata in a centralized manner, and the data storage area stores the data in a centralized manner. In other words, the data and the metadata are stored separately.

When a user needs to mount data from the archive storage 404, the backup server 402 first receives a metadata obtaining command, where the metadata obtaining command is used to obtain file system metadata in a first format, and the metadata obtaining command includes an identifier of a to-be-read target directory. Then, the backup server 402 obtains, from a metadata storage area of the archive storage 404 based on the identifier of the target directory, file system metadata that is in a second format and that corresponds to the target directory, and the backup server 402 converts the file system metadata that is in the second file format and that corresponds to the target directory into file system metadata that is in the first format and that corresponds to the target directory, and returns the file system metadata that is in the first format and that corresponds to the target directory. The file system metadata includes a subdirectory list and/or a file list of the target directory.

In the method, the backup server 402 may directly obtain, from the metadata storage area of the archive storage 404 based on the identifier of the target directory, the file system metadata that is in the second format and that corresponds to the target directory, and convert the format into the first format. There is no need to obtain all data stored during an archive storage operation and to restore the data to a storage format the same as a storage format in a production environment. This greatly shortens mounting time, implements live mounting, and meets service requirements. In addition, there is no need to create complete space in the backup storage to restore all data in the archive storage, thereby reducing costs.

Figure 4:
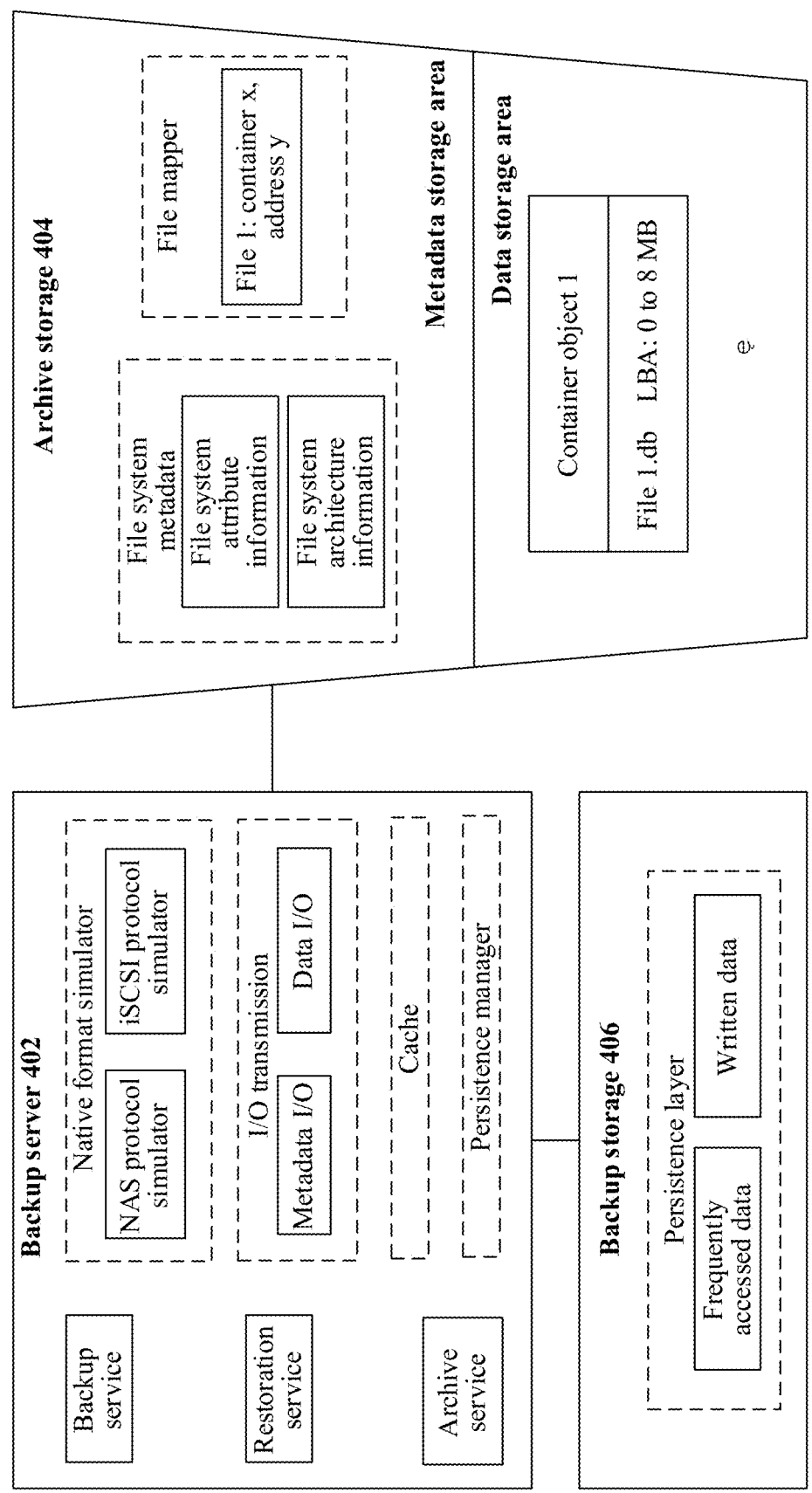
FIG. 4 is a system architectural diagram of a data processing system according to an embodiment of this application.

To make the technical solutions of this application clearer, the following first describes a system architecture in this embodiment of this application with reference to FIG. 4.

Refer to a system architecture diagram of the data processing system 400 shown in FIG. 4. As shown in FIG. 4, the data processing system 400 includes the backup server 402, the archive storage 404, and the backup storage 406. The backup server 402 and the archive storage 404 may be generally disposed separately. The backup server 402 and the backup storage 406 may be disposed in an integrated manner or may be disposed separately. The following separately describes, with reference to FIG. 5A and FIG. 5B, a hardware structure disposed in an integrated manner and a hardware structure disposed separately by using examples.

Figure 5A:
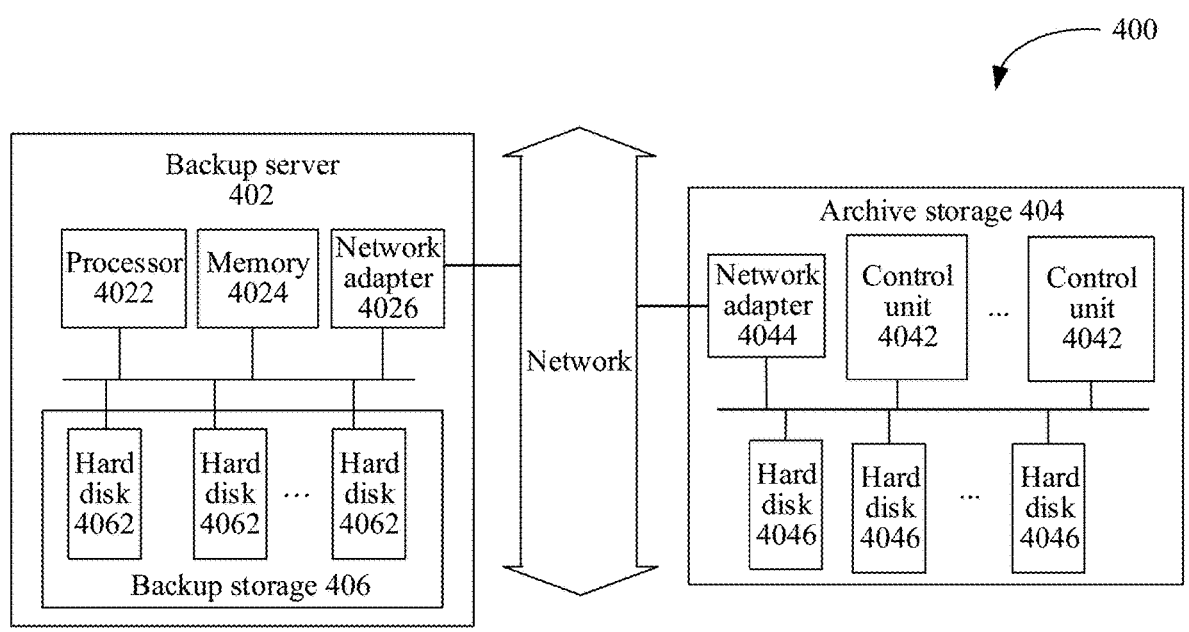
FIG. 5A is a diagram of a hardware structure of a data processing system according to an embodiment of this application.

As shown in FIG. 5A, the backup server 402 at least includes a processor 4022, a memory 4024, and a network adapter 4026. Because the backup server 402 and the backup storage 406 are disposed in a centralized manner, the backup server 402 further includes a hard disk 4062. The processor 4022, the memory 4024, the network adapter 4026, and the hard disks 4062 are connected to each other through a bus.

The processor 4022 and the memory 4024 are configured to provide computing resources. Specifically, the processor 4022 may be a central processing unit (central processing unit, CPU), configured to process a data access request from outside of the backup server 402 or a request generated inside the backup server 402. For example, when receiving a data write request, the backup server 402 temporarily stores data in the data write request in the memory 4024. When a total amount of data in the memory 4024 reaches a specific threshold, the processor 4022 sends the data stored in the memory 4024 to the hard disk 4062 in the backup storage 406 for persistent storage. In addition, the processor 4022 is further configured to perform calculation or processing on the data, for example, metadata management, deduplication, data compression, data verification, storage space virtualization, and address conversion.

The memory 4024 is an internal memory that directly exchanges data with the processor 4022. The memory 4024 can read and write data at any time at a very high speed, and is used as a temporary data memory of an operating system or another running program. There are at least two types of memories. For example, the memory may be a random access memory (RAM), or may be a read-only memory (ROM). For example, the random access memory may be a dynamic random access memory (DRAM), a storage class memory (SCM), a static random access memory (SRAM), or the like. The read-only memory may be a programmable read-only memory (PROM), an erasable programmable read-only memory (EPROM), or the like.

In practical application, a plurality of different types of memories 4024 may be configured in the backup server 402. A quantity and types of the memories 4024 are not limited in this embodiment. In addition, the memory 4024 may be configured to have a power failure protection function. The power failure protection function means that data stored in the memory 4024 is not lost when a system is powered off and then powered on again. A memory with the power failure protection function is referred to as a non-volatile memory.

The hard disk 4062 is configured to provide a storage resource. The hard disk 4062 may be a magnetic disk or another type of storage medium, for example, a solid-state disk or a shingled magnetic recording hard disk. The network adapter 4026 is configured to communicate with another device, for example, configured to communicate with the archive storage 404. The archive storage 404 includes a control unit 4042, a network adapter 4044, and several hard disks 4046. Generally, there may be one, two, or more control units 4042. When the archive storage 404 includes at least two control units 4042, there may be a homing relationship between the hard disk 4046 and the control unit 4042. If the homing relationship between the hard disk 4046 and the control unit 4042 exists, each control unit 4042 can access only the hard disk 4046 that belongs to the control unit 4042. This usually involves forwarding a read/write data request between the control units 4042, resulting in a long data access path. In addition, if storage space is insufficient, a new hard disk 4046 may be added to the archive storage 404, and the homing relationship between the hard disk 4046 and the control unit 4042 is rebound. In another implementation, a function of the control unit 4042 may be offloaded to the network adapter 4044. In other words, in this implementation, the archive storage 404 does not have the control unit 4042 inside, but the network adapter 4044 completes data reading/writing, address translation, and other computing functions. In this case, the network adapter 4044 is an intelligent network interface card. The intelligent network interface card may include a CPU and a memory.

Figure 5B:
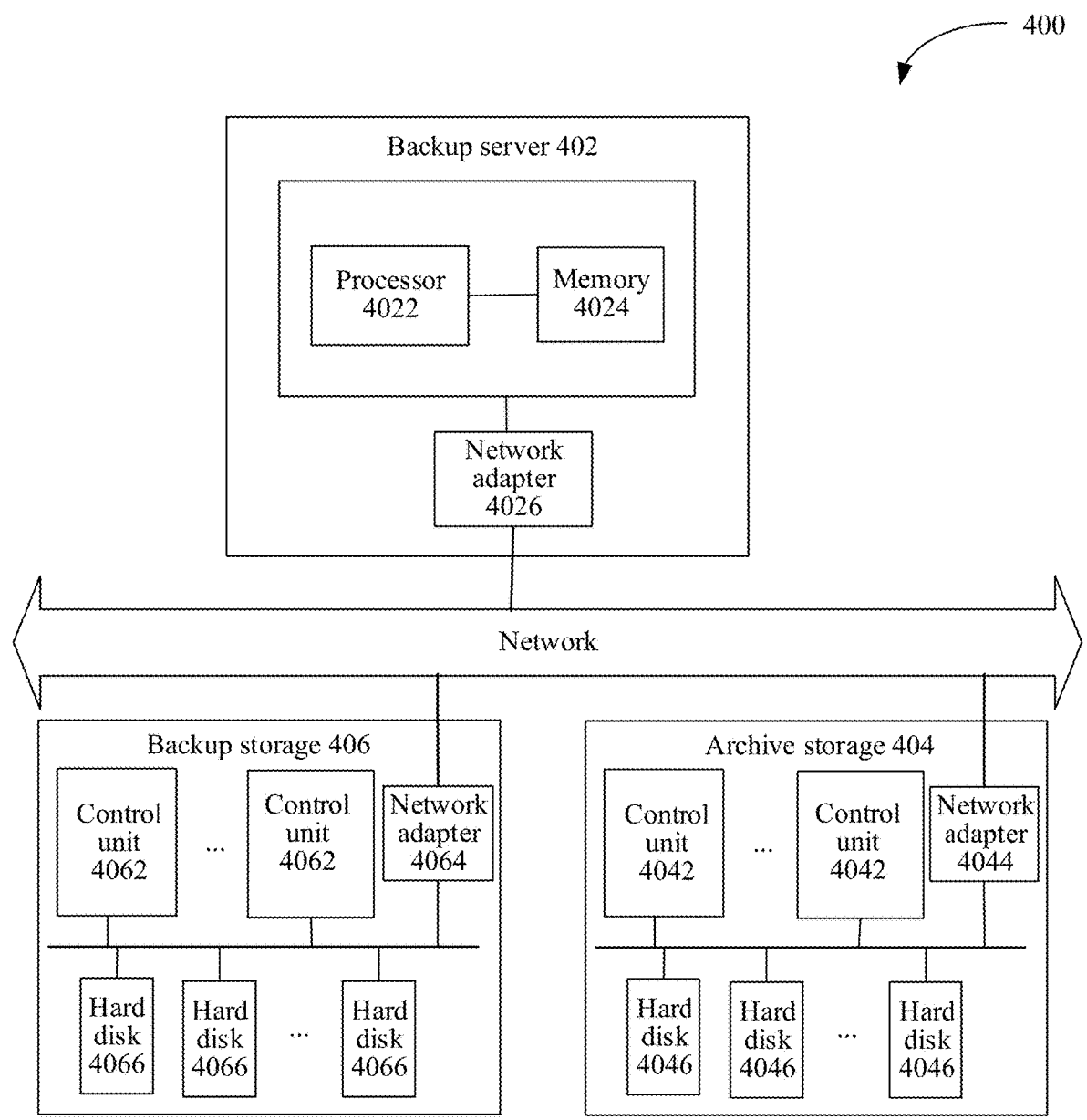
FIG. 5B is a diagram of a hardware structure of another data processing system according to an embodiment of this application.

Then, refer to FIG. 5B. The backup server 402 at least includes the processor 4022, the memory 4024, and the network adapter 4026, the archive storage 404 includes the control unit 4042, the network adapter 4044, and the hard disk 4046, and the backup storage 406 includes the control unit 4062, the network adapter 4064, and the hard disk 4066. For specific implementation of the processor 4022, the memory 4024, the network adapter 4026, the control unit 4042, the network adapter 4044, the hard disk 4046, the control unit 4062, the network adapter 4064, and the hard disk 4066, refer to related descriptions in FIG. 5A. In FIG. 5B, the backup server 402 and the backup storage 406, and the backup server 402 and the archive storage 404 are disposed separately. Specifically, the network adapter 4026 of the backup server 402 is separately connected to the network adapter 4064 of the backup storage 406 and the network adapter 4044 of the archive storage 404 through a network, to implement data reading and writing.

FIG. 5A and FIG. 5B describe the backup server 402, the archive storage 404, and the backup storage 406 from the perspective of hardware. The following describes the backup server 402, the archive storage 404, and the backup storage 406 from the perspective of data access.

In this embodiment, the backup server 402 may not only provide a backup service, a restoration service, and an archive service, but also provide a mounting service. The backup service refers to backing up data in a production environment. The restoration service refers to restoring production based on backup data when the production environment is abnormal. The archiving service refers to archiving and storing backup data. Mounting means mounting data to a host, for example, mounting data of the backup storage 406 or the archive storage 404 to the host.

This embodiment focuses on describing a process in which the backup server 402 mounts the data of the archive storage 404 to the host. As shown in FIG. 4, the archive storage 404 includes a data storage area and a metadata storage area. The data storage area is used to store data in a centralized manner, and the metadata storage area is used to store metadata in a centralized manner.

Specifically, the data storage area stores a plurality of container objects, and each container object includes partial data of a file and an address of the partial data in the file. For example, a container object 1 includes first partial data of a file 1 and an LBA address of the first partial data in the file 1, where the LBA address of the first partial data is specifically 0 to 8 megabytes (MB).

The metadata storage area stores file system metadata and file mapping relationship metadata. Specifically, the file system metadata is stored through a file system metadata object, and the file mapping relationship metadata is stored through a file mapper object. The file system metadata may include file system attribute information and file system architecture information. The file system attribute information may include one or more types of information such as a file name, a file size, permission control information, and an access/creation/modification (access/creation/modification, a/c/m) time. The file system architecture information includes one or more types of information such as a directory to which a file belongs and a subdirectory of a directory to which a file belongs. For a directory, a subdirectory list and/or a file list of the directory may be constructed based on the file system metadata. The file mapping relationship metadata is used to describe a correspondence between partial data of a file and a container object that stores the partial data. For example, the file mapping relationship metadata may include a correspondence between data whose LBA address is 0 to 8 MB in the file 1 and the container object 1.

The backup server 402 may restore a file system based on the file system metadata, to implement metadata input/output (I/O), and restore data in the file based on the file mapping relationship metadata, to implement data I/O. The metadata I/O may include browsing a directory, and the data I/O may include reading/writing the data in the file.

The backup server 402 may implement metadata I/O and data I/O through a native format simulator and an I/O transfer.

A native format may be understood as an original format, for example, a format of data in a production environment. The native format may include storage formats such as block storage and file storage. The native format simulator is a simulator that shares, in a native format, data in an archive object to a host according to a storage protocol. The storage protocol varies based on different native formats. For example, when the native format is the file storage, the storage protocol may be a NAS protocol, and when the native format is the block storage, the storage protocol may be an iSCSI protocol. Based on this, the native format simulator may include at least one of a NAS protocol simulator and an iSCSI protocol simulator. In this embodiment, an I/O command sent by the host, for example, a command for browsing a directory, reading data, or writing data, may be parsed by the native format simulator.

The I/O transfer can obtain the parsed I/O command from the native format simulator and determine an actual location to which the I/O command should be sent. For example, when to-be-read/written data or metadata is stored in the archive storage 404, the I/O transfer may convert the I/O command, and forward the converted I/O command to the archive storage 404.

For frequently accessed data or metadata (including recently accessed data or metadata), the backup server 402 may further write the frequently accessed data or metadata into a cache (cache) of the backup server 402, to accelerate a subsequent access. When writing the frequently accessed data or metadata into the cache, the backup server 402 may further write the frequently accessed data or metadata into a persistence layer of the backup storage 406, to perform persistent storage.

It should be noted that when data that needs to be written in the cache exceeds a cache size limit, part of cold data (data that is less frequently accessed or that has not been accessed for a long time) may be sifted out from the cache, to write data that needs to be written into the cache. When popularity of the data sifted out from the cache is higher than popularity of data in the archive storage, the data sifted out from the cache may be further written into the backup storage 406, so that the data can be quickly returned when being accessed again.

When the backup server 402 updates the data of the file in the archive storage 404, the backup server 402 may further organize the data into a proper format based on a persistence manager, for example, a storage format supported by the backup storage 406, and write the data into the persistence layer of the backup storage 406 rather than writing the data into the archive storage 404. In an aspect, performance of subsequent reading of the partial data can be improved. In another aspect, damage to the data in the archive storage 404 can be avoided.

An architecture of the data processing system 400 is described in detail in the embodiment shown in FIG. 4. The following describes in detail the data processing method in this embodiment of this application from the perspective of interaction.

Figure 6A:
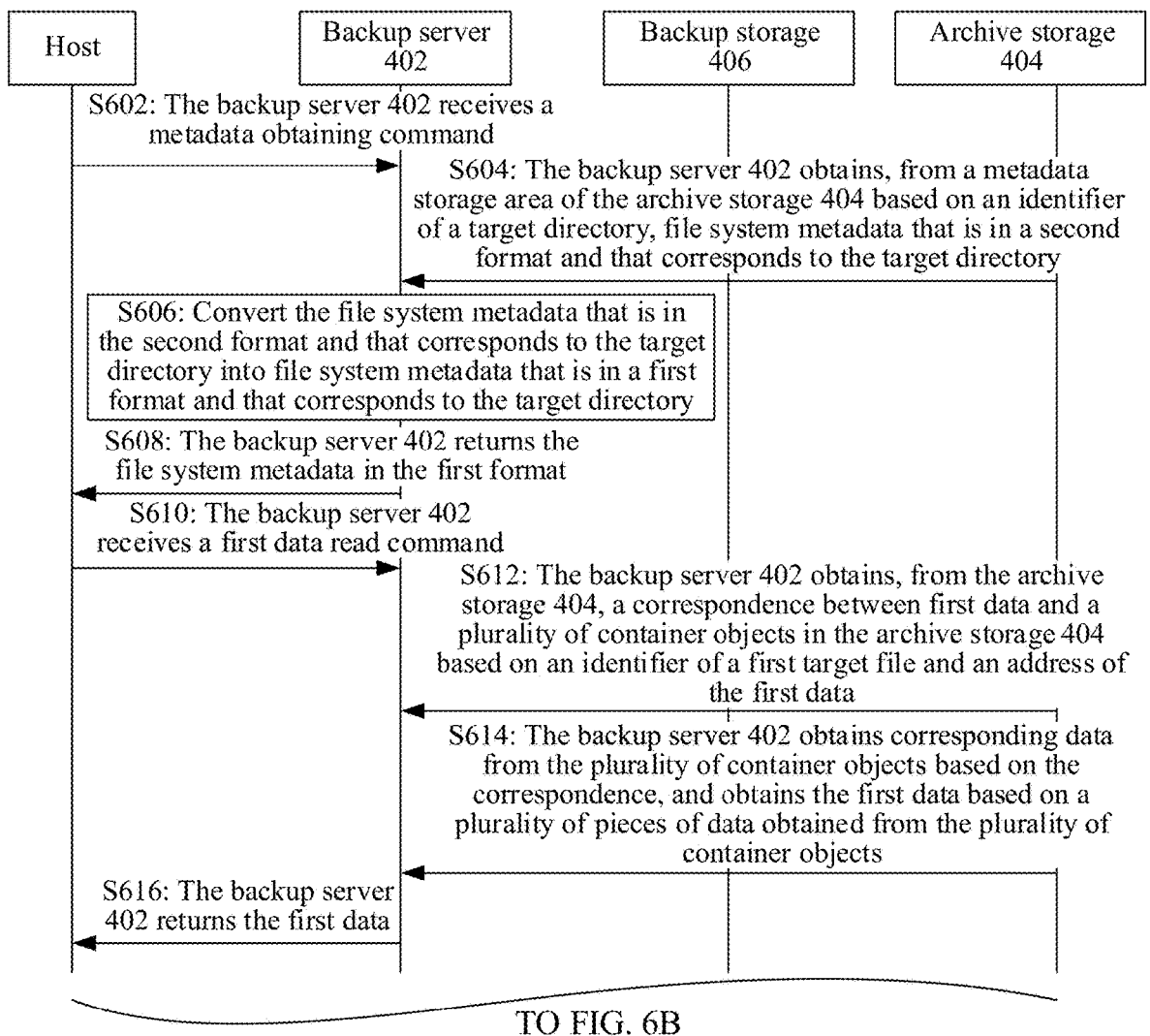
FIG. 6A and FIG. 6B are a flowchart of a data processing method according to an embodiment of this application.
Figure 6B:
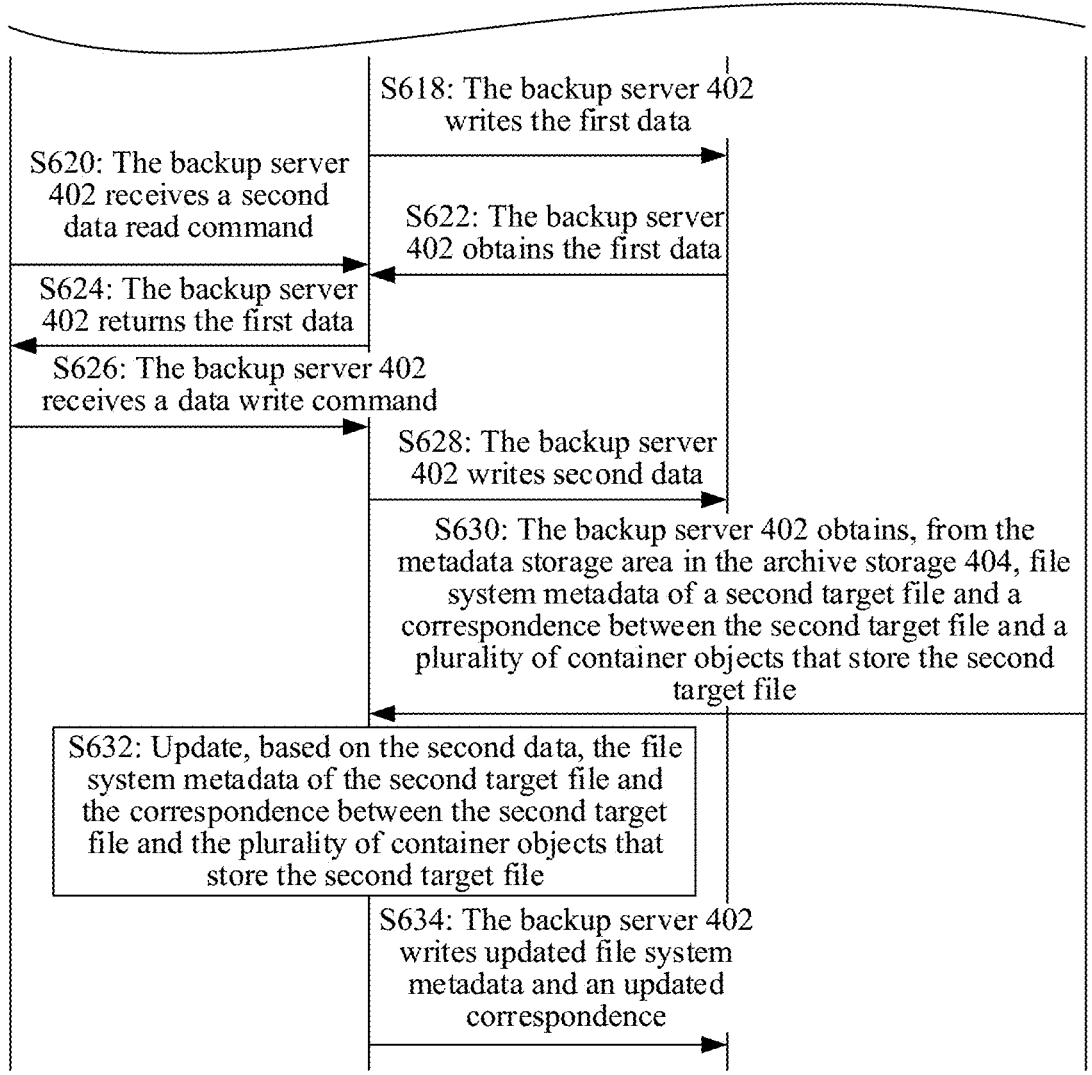

Refer to a flowchart of a data processing method shown in FIG. 6A and FIG. 6B. The method includes the following steps.

S602: The backup server 402 receives a metadata obtaining command sent by a host.

The metadata obtaining command is used to obtain file system metadata in a first format. The first format may be a native format, that is, a format of data in a production environment. In some embodiments, the first format may be block storage or file storage. The metadata obtaining command includes an identifier (ID) of a to-be-read target directory. The ID of the target directory may be, for example, a name of the target directory. The metadata obtaining command is used to obtain file system metadata corresponding to the target directory, for example, may include a subdirectory list and/or a file list of the target directory.

The subdirectory list indicates each subdirectory included in the target directory, for example, one or more types of information such as a name, a creation time, an access time, a modification time, a type, a creator, or a size of each subdirectory included in the target directory. The file list identifies each file included in the target directory, for example, one or more types of information such as a name, a creation time, an access time, a modification time, a type, a creator, or a size of each file included in the target directory.

The host can be a test host, a development host, or an analysis host. A user may trigger an operation of obtaining metadata through the host, for example, trigger an operation of browsing a directory. The host generates a metadata obtaining command in response to the operation of the user, and then sends the metadata obtaining command to the backup server 402. Correspondingly, the backup server 402 receives the metadata obtaining command, to respond to the operation of the user according to the command.

S604: The backup server 402 obtains, from a metadata storage area of the archive storage 404 based on the identifier of the to-be-read target directory in the metadata obtaining command, file system metadata that is in a second format and that corresponds to the target directory.

The metadata storage area is provided in the archive storage 404. The metadata storage area stores metadata in a centralized manner, for example, stores the file system metadata in a centralized manner. Based on this, the backup server 402 may search the metadata storage area for the ID of the target directory based on the ID of the target directory. When the search succeeds, the backup server 402 may obtain the file system metadata that is in the second format and that corresponds to the target directory. The second format is a format of data in the archive storage 404, for example, may be an object-based storage format.

S606: The backup server 402 converts the file system metadata that is in the second format and that corresponds to the target directory into file system metadata that is in the first format and that corresponds to the target directory.

Specifically, the file system metadata that is in the second format and that corresponds to the target directory is generally stored as an object. The backup server 402 may separately obtain, from a plurality of file system metadata objects, partial data of the file system metadata that is in the second format and that corresponds to the target directory, and then combine the obtained partial data to form continuous data, to convert the obtained partial data into file system metadata in block storage or file system metadata in file storage. In this way, the backup server 402 may convert the file system metadata that is in the second format and that corresponds to the target directory into file system metadata that is in the first format and that corresponds to the target directory.

S608: The backup server 402 returns the file system metadata that is in the first format and that corresponds to the target directory to the host.

Specifically, the backup server 402 returns the file system metadata that is in the first format and that corresponds to the target directory to the host, so that the host can restore the file system based on the file system metadata. For example, the host may quickly mount the file system based on the file system metadata in the first format returned by the backup server 402, for example, the subdirectory list and/or the file list of the target directory.

S610: The backup server 402 receives a first data read command that is sent by the host and that is used to read first data.

The first data belongs to a first target file in the target directory, and the first data read command includes an identifier of the first target file and an address of the first data. The identifier of the first target file may be a name of the first target file. The address of the first data is specifically an address of the first data in the first target file. It is assumed that a size of the first target file is n MB, the address of the first data may be represented as an $i^{th}$ MB to a $j^{th}$ MB, where values of i and j range from 0 to n.

Specifically, after the host restores the file system based on the file system metadata that is in the first format and that corresponds to the target directory, the user may browse the directory through the host, and trigger an operation of reading data in the target directory when browsing the directory, for example, an operation of reading the first data. The host generates the first data read command in response to the operation. Then, the host sends the first data read command to the backup server 402.

S612: The backup server 402 obtains, from the archive storage 404, a correspondence between the first data and a plurality of container objects in the archive storage 404 based on the identifier of the first target file and the address of the first data.

The metadata storage area of the archive storage 404 further stores file mapping relationship metadata in a centralized manner. The file mapping relationship metadata is specifically stored through a file mapper object. The backup server 402 may obtain, from the archive storage 404, the correspondence between the first data and the plurality of container objects in the archive storage 404 based on the identifier of the first target file and the address of the first data. The plurality of container objects each store partial data of the first data.

For ease of understanding, the following provides descriptions with reference to specific examples. It is assumed that the identifier of the first target file is a file 1, and the address of the first data is 9 MB to 24 MB. The backup server 402 may first search for the file 1 based on an identification field of the file, to obtain all file mapping relationship metadata including the file 1, and then search for an address within 9 MB to 24 MB based on an address field of data, to obtain the correspondence between the first data and the plurality of container objects in the archive storage 404. In this example, the correspondence may include a correspondence between data of a 9th MB to a 16th MB in the file 1 and a container object 2, and a correspondence between data of a 17th MB to a 24th MB in the file 1 and a container object 3.

S614: The backup server 402 obtains corresponding data from the plurality of container objects based on the correspondence, and obtains the first data based on a plurality of pieces of data obtained from the plurality of container objects.

Specifically, the backup server 402 may separately obtain partial data of the first data from the plurality of container objects corresponding to the first data, and then combine the partial data of the first data obtained from the plurality of containers, to obtain the complete first data.

The foregoing example is still used for description. The backup server 402 may separately obtain corresponding data from the container object 2 and the container object 3 based on a relationship between the data of the 9th MB to the 24th MB in the file 1 and the container object 2 and the container object 3, and then combine the data obtained from the container object 2 and the container object 3, to obtain the complete first data.

S616: The backup server 402 returns the first data to the host.

Specifically, the backup server 402 may share the first data with the host according to a storage protocol. For example, when the first data is in the file storage format, the backup server 402 may share the first data with the host according to a NAS protocol. For another example, when the first data is in the block storage format, the backup server 402 may share the first data with the host according to the iSCSI protocol.

S618: The backup server 402 writes the first data into a backup storage.

Specifically, the backup server 402 may first write the first data into a cache, and then write the first data from the cache into the backup storage 406, to perform persistent storage. It should be noted that the backup server 402 may write the first data from the cache into the backup storage 406 when the backup server 402 is powered off, or may sift out the first data from the cache when new data needs to be written into the cache and a size of the data that needs to be written into the cache exceeds a cache size limit. When popularity of the first data is higher than popularity of the data in the archive storage 404, the backup server 402 may write the sifted-out first data into the backup storage 406.

S620: The backup server 402 receives a second data read command used to read the first data.

In some embodiments, the user may trigger an operation of re-reading the first data, and the host may generate, in response to the operation of the user, the second data read command used to read the first data. Similar to the first data read command, the second data read command includes the identifier of the first target file and the address of the first data. The backup server 402 receives the second data read command, to re-read second data.

S622: The backup server 402 obtains the first data from the backup storage 406.

Specifically, the backup server 402 may search for the backup storage 406 based on the identifier of the first target file and the first data address. When the backup storage 406 includes the first data, the backup server 402 may directly obtain the first data from the backup storage 406, to implement accelerated access.

S624: The backup server 402 returns the first data to the host.

Refer to the related content descriptions in S616. The backup server 402 may share the first data to the host based on a storage format of the first data according to a storage protocol that matches the storage format, to perform data mounting.

S626: The backup server 402 receives a data write command that is sent by the host and that is used to write the second data.

Specifically, when browsing the target directory, the user may further trigger an update operation on a second target file in the target directory. The update operation is specifically updating data of the second target file. The host may generate, in response to the update operation of the user, a write command used to write the second data. The write command may include an identifier of the second target file, an address of the second data in the second target file, and the second data. The backup server 402 receives the data write command sent by the host to write data.

S628: The backup server 402 writes the second data into the backup storage 406 according to the data write command.

Specifically, the backup server 402 first writes the second data into the cache according to the data write command, and then writes the second data from the cache into the backup storage 406, to perform persistent storage in the backup storage 406.

S630: The backup server 402 obtains, from the metadata storage area of the archive storage 404, file system metadata of the second target file and a correspondence between the second target file and a plurality of container objects that store the second target file.

Specifically, the backup server 402 may obtain, from the archive storage based on the identifier of the second target file, the file system metadata of the second target file and the correspondence between the second target file and the plurality of container objects that store the second target file.

S632: The backup server 402 updates, based on the second data, the file system metadata of the second target file and the correspondence between the second target file and the plurality of container objects that store the second target file.

The backup server 402 may update the file system metadata of the second target file based on the written second data, for example, update metadata such as a modification time and a size, and update, based on the written second data, the correspondence between the second target file and the plurality of container objects that store the second target file.

S634: The backup server 402 writes updated file system metadata of the second target file and an updated correspondence between the second target file and the plurality of container objects that store the second target file into the backup storage 406.

The backup server 402 may write the updated file system metadata into the backup storage 406, and write the updated correspondence into the backup storage 406, so that when the data of the second target file is subsequently read, whether to-be-read data is stored in the backup storage 406 may be quickly searched for from the updated file system metadata and the updated correspondence that are stored in the backup storage 406.

Similar to writing the second data, when writing the updated file system metadata and the updated correspondence, the backup server 402 may alternatively first write the updated file system metadata and the updated correspondence in the cache, and then write the updated file system metadata and the updated correspondence from the cache into a persistent layer of the backup storage 406, to perform persistent storage.

It should be noted that S610 to S634 are optional steps in this embodiment of this application. S610 to S616 are implementations of reading data that has not been accessed, S618 is an implementation of accelerating access, S620 to S624 are implementations of reading data that has been accessed, and S626 to S634 are an implementation of updating data in the archive storage. In another possible implementation of this embodiment of this application, the data may be read or written in another manner. In addition, this embodiment shown in FIG. 6A and FIG. 6B is described by using an example in which a same host initiates the metadata obtaining command, the first data read command, the second data read command, and the data write command. In some possible implementations, the backup server 402 may simultaneously provide services for a plurality of hosts. For example, a first host initiates the first data read command, and the backup server 402 may obtain corresponding data from the archive storage 404, share the data with the first host, and then write the first data into the backup storage 406. A second host initiates the second data read command, and the backup server 402 may obtain corresponding data from the backup storage 406 and share the data with the second host.

Based on the foregoing content descriptions, this embodiment of this application provides the data processing method. In the method, the backup server 402 may directly obtain, from the metadata storage area of the archive storage 404 based on the identifier of the target directory, the file system metadata that is in the second format and that corresponds to the target directory, and convert the format into the first format. There is no need to obtain all data stored during an archive storage operation and to restore the data to a storage format the same as a storage format in a production environment. This greatly shortens mounting time, implements live mounting, and meets service requirements. In addition, there is no need to create complete space in the backup storage to restore all data in the archive storage, thereby reducing costs.

When reading the data that has not been accessed, the backup server 402 may directly obtain, from the metadata storage area of the archive storage 404, a correspondence between the data that has not been accessed and the plurality of container objects, and obtain corresponding data based on the correspondence, to obtain data that needs to be read. In this way, all data in the archive storage does not need to be obtained, thereby improving read efficiency and reducing transmission and storage overheads. In addition, the backup server 402 may further write the read data into the backup storage 406, to accelerate subsequent access. When updating the data in the archive storage 404, the backup server 402 may write the data into the backup storage. In an aspect, subsequent access can be accelerated. In another aspect, damage to the data in the archive storage 404 can be avoided.

The following describes a process of obtaining metadata, writing data, and reading data in detail with reference to the accompanying drawings from the perspective of internal interaction of the backup server 402.

Figure 7:
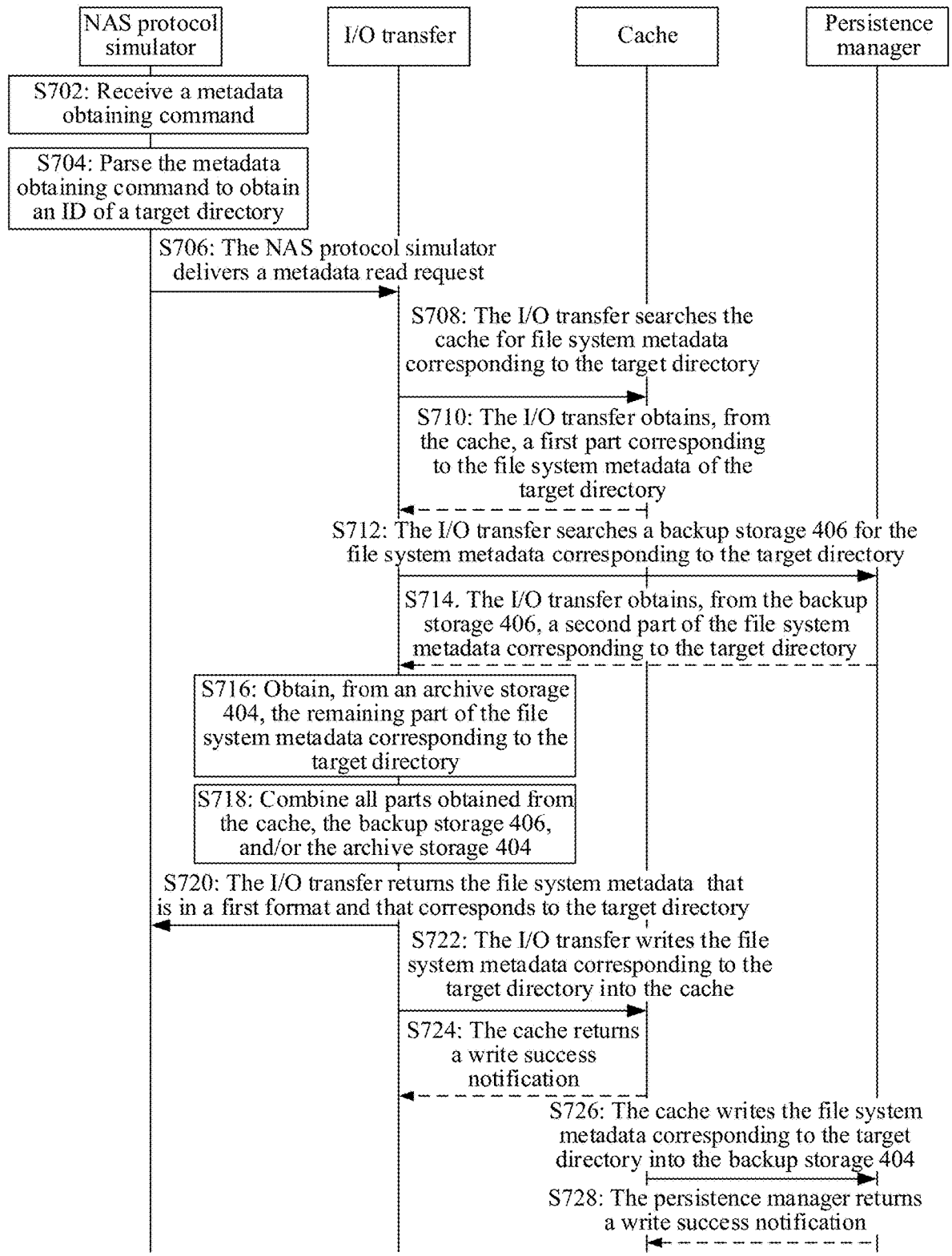
FIG. 7 is a flowchart of a data processing method according to an embodiment of this application.

Refer to a flowchart of a data processing method shown in FIG. 7. The method includes the following steps.

S702: A NAS protocol simulator receives a metadata obtaining command.

S704: The NAS protocol simulator parses the metadata obtaining command to obtain an ID of a target directory.

S706: The NAS protocol simulator delivers a metadata read request.

In S702 to S706, a NAS protocol intercepts the metadata obtaining command sent by a host, parses the metadata obtaining command according to the NAS protocol to obtain the ID of the target directory, and then delivers the metadata read request based on the ID of the target directory, to request to read file system metadata that is in a first format and that corresponds to the target directory.

S708: An I/O transfer searches a cache for the file system metadata corresponding to the target directory. When the cache includes a first part of the file system metadata corresponding to the target directory, S710 is performed.

S710: The I/O transfer obtains, from the cache, the first part of the file system metadata corresponding to the target directory.

The I/O transfer may first search, based on the ID of the target directory, the cache for the file system metadata corresponding to the target directory. When the cache includes the file system metadata corresponding to the target directory, for example, the target directory has been accessed recently, and the file system metadata corresponding to the target directory is written into the cache, the I/O transfer may directly obtain, from the cache, the file system metadata corresponding to the target directory. When the cache includes partial data of the file system metadata corresponding to the target directory, S710 may be performed to obtain the partial data of the file system metadata, for example, the first part. When the cache does not include the file system metadata corresponding to the target directory, for example, the target directory has not been accessed, or the target directory has been accessed, but the file system metadata written into the cache is sifted out from the cache, S712 may be performed.

S712: The I/O transfer searches the backup storage 406 for the file system metadata corresponding to the target directory. When the backup storage includes a second part of the file system metadata corresponding to the target directory, S714 is performed.

S714: The I/O transfer obtains, from the backup storage 406, the second part of the file system metadata corresponding to the target directory.

S716: The I/O transfer obtains, from the archive storage 404, the remaining part of the file system metadata corresponding to the target directory.

Specifically, when the cache includes the partial data of the file system metadata corresponding to the target directory, or does not include the file system metadata corresponding to the target directory, the I/O transfer may search the backup storage 406 for the file system metadata corresponding to the target directory.

When the backup storage 406 includes the partial data, for example, the second part, of the file system metadata corresponding to the target directory, S714 may be performed to obtain the second part. When the first part and the second part may form the complete file system metadata, S716 may not be performed. When the first part and the second part cannot form the complete file system metadata, the I/O transfer further performs S716 to obtain, from the archive storage 404, the remaining part of the file system metadata corresponding to the target directory. When the backup storage 406 does not include the file system metadata corresponding to the target directory, S714 may not be performed.

S718: The I/O transfer combines all parts obtained from the cache, the backup storage 406, and/or the archive storage 404, to obtain the file system metadata that is in the first format and that corresponds to the target directory.

Specifically, the I/O transfer may combine, according to a corresponding rule, all parts of the file system metadata that correspond to the target directory and that are obtained from the cache, the backup storage 406, and/or the archive storage 404, to obtain the file system metadata that is in the first format and that corresponds to the target directory.

S720: The I/O transfer returns the file system metadata that is in the first format and that corresponds to the target directory.

S722: The I/O transfer writes the file system metadata that is in the first format and that corresponds to the target directory into the cache.

S724: The cache returns a write success notification.

When the file system metadata in the first format is successfully written into the cache, the cache may return the write success notification.

It should be noted that during performing the data processing method in this embodiment of this application, S724 may alternatively not be performed. For example, when the cache has a power failure protection function, there is a low probability that data written into the cache is lost, so that S724 may not be performed.

S726: The cache writes the file system metadata that is in the first format and that corresponds to the target directory into the backup storage 406.

S728: A persistence manager returns a write success notification.

The cache may write the file system metadata in the first format into the backup storage 406 through the persistence manager. After the file system metadata in the first format is successfully written into the backup storage 406, the persistence manager returns the write success notification.

Similar to S724, during performing the data processing method in this embodiment of this application, S728 may alternatively not be performed. The backup storage 406 generally has a power failure protection function, and there is a low probability that data written into the backup storage 406 is lost, so that S728 may not be performed.

Figure 8:
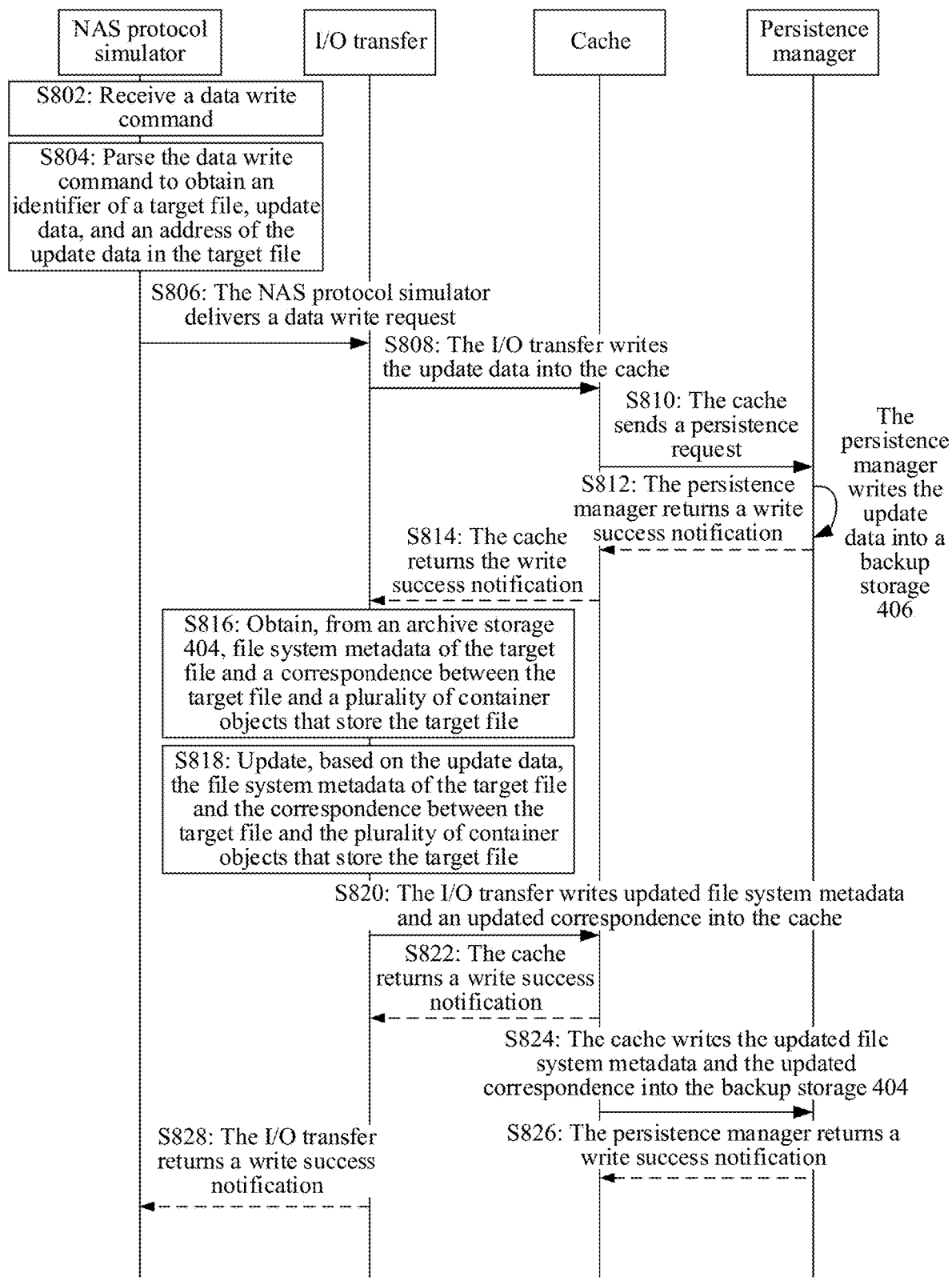
FIG. 8 is a flowchart of a data processing method according to an embodiment of this application.

Next, refer to a flowchart of a data processing method shown in FIG. 8. The method includes the following steps.

S802: A NAS protocol simulator receives a data write command.

S804: The NAS protocol simulator parses the data write command to obtain an identifier of a target file, update data, and an address of the update data in the target file.

S806: The NAS protocol simulator delivers a data read request.

In S802 to S806, a NAS protocol intercepts the data write command sent by a host, and parses the data write command according to the NAS protocol, to obtain the identifier of the target file, the update data, and the address of the update data in the target file. The target file may be, for example, the file in the target directory in the embodiment shown in FIG. 7, the update data is update data of the target file, and the address of the update data in the target file may include a start address of the update data in the target file. Then, the NAS protocol simulator may deliver the data write request to request to write the update data, to update the target file.

S808: An I/O transfer writes the update data into a cache.

S810: The I/O transfer sends a persistence request to a persistence manager.

S811. The persistence manager writes the update data into the backup storage 406.

S812: The persistence manager returns a write success notification to the cache.

S814: The cache returns the write success notification to the I/O transfer.

It should be noted that when the cache has a loss prevention capability, for example, when the cache uses a high-speed SSD, the write success notification may also be returned to the I/O transfer when the data is written into the cache.

S816: The I/O transfer obtains, from the archive storage 404, file system metadata of the target file and a correspondence between the target file and a plurality of container objects that store the target file.

S818: The I/O transfer updates, based on the update data, the file system metadata of the target file and the correspondence between the target file and the plurality of container objects that store the target file.

S820: The I/O transfer writes updated file system metadata and an updated correspondence into the cache.

The I/O transfer may record data of the target file in the cache and the backup storage 406, and data still in the archive storage 404, so that the data can be quickly and accurately obtained when the target file is accessed next time.

S822: The cache returns a write success notification.

S824: The cache writes the updated file system metadata and the updated correspondence into the backup storage 406.

S826: The persistence manager returns a write success notification.

S828: The I/O transfer returns a write success notification.

Figure 9:
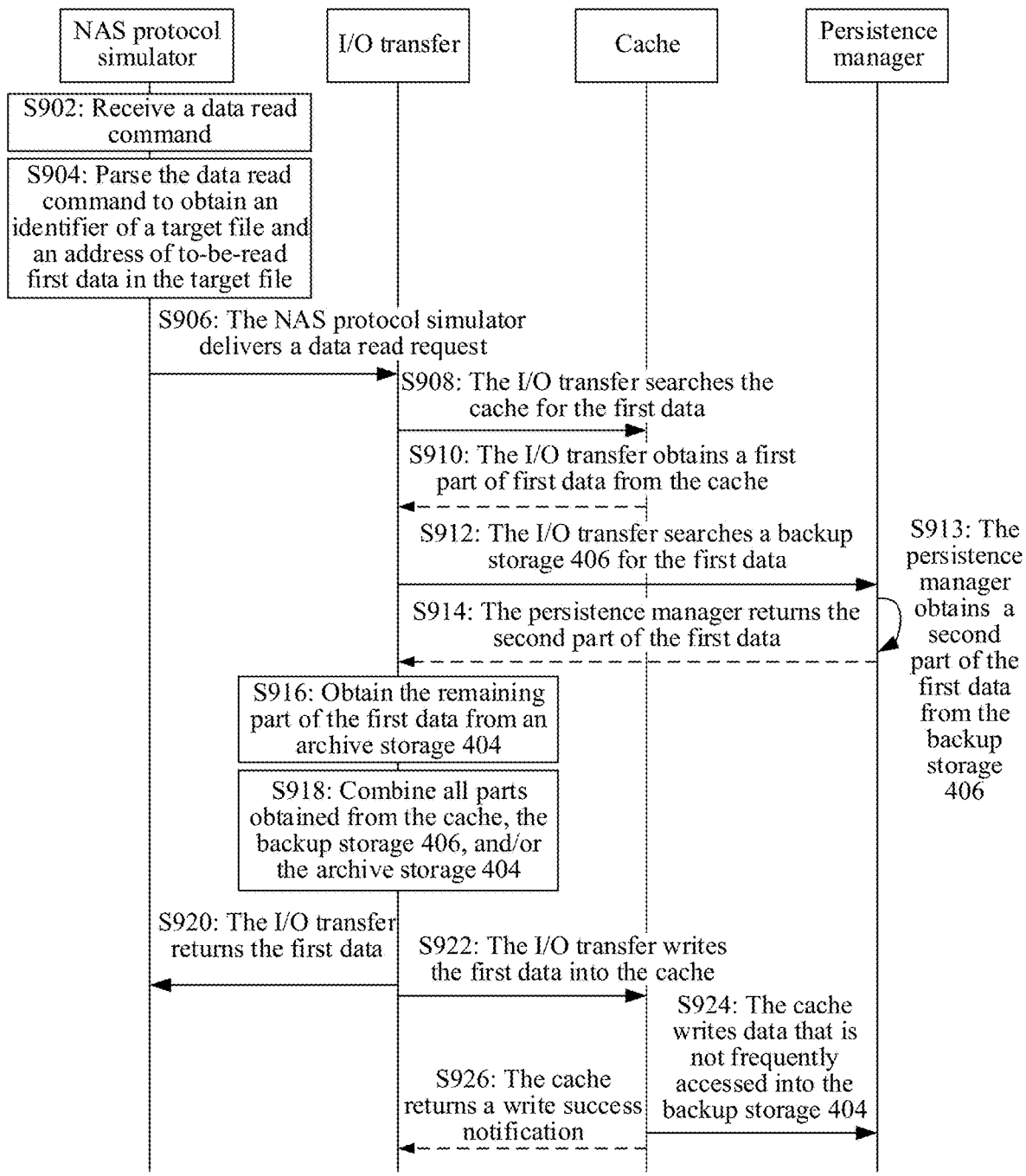
FIG. 9 is a flowchart of a data processing method according to an embodiment of this application.

Then, refer to a flowchart of a data processing method shown in FIG. 9. The method includes the following steps.

S902: A NAS protocol simulator receives a data read command.

S904: The NAS protocol simulator parses the data read command to obtain an identifier of a target file and an address of to-be-read first data in the target file.

S906: The NAS protocol simulator delivers a data read request.

In S902 to S906, a NAS protocol intercepts the data read command sent by a host, and parses the data read command according to the NAS protocol to obtain the identifier of the target file and the address of the to-be-read first data in the target file. The target file may be the file in the target directory in the embodiment shown in FIG. 7. It should be further noted that the target file for writing data in the embodiment shown in FIG. 8 and the target file for reading data in the embodiment shown in FIG. 9 may be a same file or different files. This embodiment is described by using an example in which two target files are the same file. The address of the to-be-read first data in the target file may be characterized by a start address and a length, or may be characterized by a start address and an end address. This is not limited in this embodiment.

After obtaining the identifier of the target file and the address of the to-be-read first data in the target file, the NAS protocol simulator may generate the data write request based on the identifier of the target file and the address of the to-be-read first data in the target file, and send the data write request to the I/O transfer.

S908: The I/O transfer searches the cache for the first data. When the cache includes a first part of the first data, S910 is performed.

S910: The I/O transfer obtains the first part of the first data from the cache.

When the cache includes the first data, for example, the first data has been accessed recently, and the first data is written into the cache, the I/O transfer may directly obtain the first data from the cache. When the cache includes partial data of the first data, S910 may be performed to obtain the partial data of the first data, for example, the first part. When the cache does not include the first data, for example, the first data has not been accessed, or the first data has been accessed, but the first data written into the cache is sifted out from the cache, S912 may be performed.

S912: The I/O transfer searches the backup storage 406 for the first data. When the backup storage 406 includes a second part of the first data, S914 is performed.

S914: The I/O transfer obtains the second part of the first data from the backup storage 406.

S916: The I/O transfer obtains the remaining part of the first data from the archive storage 404.

Specifically, when the cache includes the partial data of the first data, or does not include the first data, the I/O transfer may search the backup storage 406 for the first data.

When the backup storage 406 includes the partial data of the first data, for example, the second part, S914 may be performed to obtain the second part. When the first part and the second part may form the complete first data, S916 may not be performed. When the first part and the second part cannot form the complete first data, the I/O transfer further performs S916 to obtain the remaining part of the first data from the archive storage 404. When the backup storage 406 does not include the first data, S914 may not be performed.

S918: The I/O transfer combines all parts obtained from the cache, the backup storage 406, and/or the archive storage 404, to obtain the first data.

Specifically, the I/O transfer may combine, according to a corresponding rule, all parts of the file system metadata that correspond to the target directory and that are obtained from the cache, the backup storage 406, and/or the archive storage 404, to obtain the file system metadata that is in a first format and that corresponds to the target directory.

S920: The I/O transfer returns the first data.

S922: The I/O transfer writes the first data into the cache.

S924: The cache writes data that is not frequently accessed into the backup storage 406.

S926: The cache returns a write success notification.

During performing the data processing method in this embodiment of this application, S926 may alternatively not be performed. For example, there is a low probability that data written into the backup storage 406 is lost, so that the cache may not perform S926.

The foregoing describes in detail the data processing method provided in embodiments of this application with reference to the accompanying drawings. The following describes a data processing apparatus provided in this embodiment of this application with reference to the accompanying drawings.

Figure 10:
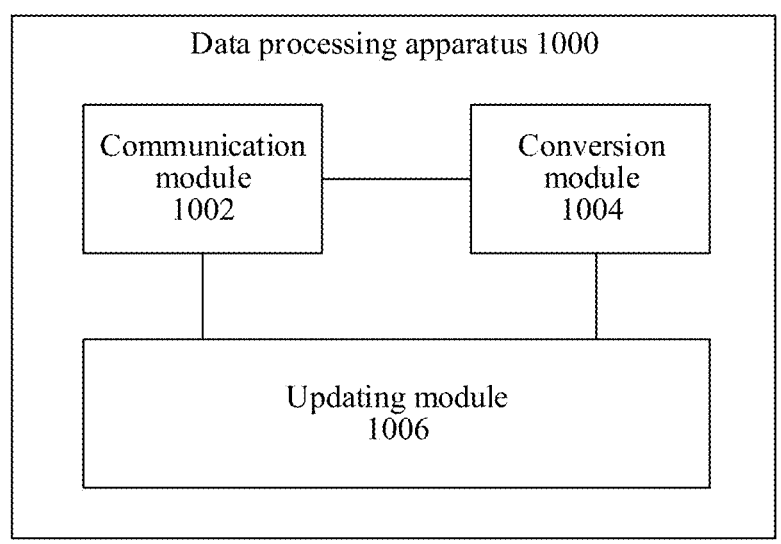
FIG. 10 is a schematic diagram of a structure of a data processing apparatus according to an embodiment of this application.

Refer to a schematic diagram of a structure of a data processing apparatus shown in FIG. 10. The apparatus 1000 includes a communication module 1002 and a conversion module 1004.

The communication module 1002 is configured to receive a metadata obtaining command, where the metadata obtaining command is used to obtain file system metadata in a first format, and the metadata obtaining command includes an identifier of a to-be-read target directory.

The communication module 1002 is further configured to obtain, from a metadata storage area of an archive storage based on the identifier of the target directory, file system metadata that is in a second format and that corresponds to the target directory, where the metadata storage area stores metadata in a centralized manner.

The conversion module 1004 is configured to convert the file system metadata that is in the second format and that corresponds to the target directory into file system metadata that is in the first format and that corresponds to the target directory.

The communication module 1002 is further configured to return the file system metadata that is in the first format and that corresponds to the target directory, where the file system metadata includes a subdirectory list and/or a file list of the target directory.

In some possible implementations, the communication module 1002 is further configured to:
  receive a first data read command used to read first data, where the first data belongs to a first target file in the target directory, and the first data read command includes an identifier of the first target file and an address of the first data;
  obtain, from the archive storage, a correspondence between the first data and a plurality of container objects in the archive storage based on the identifier of the first target file and the address of the first data, where the plurality of container objects each store partial data of the first data; and
  obtain corresponding data from the plurality of container objects based on the correspondence, obtain the first data based on a plurality of pieces of data obtained from the plurality of container objects, and return the first data.

In some possible implementations, the communication module 1002 is further configured to:
  write the first data into a backup storage.

In some possible implementations, the communication module 1002 is further configured to:
  receive a second data read command used to read the first data;
  obtain the first data from the backup storage; and
  return the first data.

In some possible implementations, the communication module 1002 is further configured to:
  receive a data write command used to write second data, where the second data is update data of a second target file in the target directory; and
  write the second data into the backup storage according to the data write command.

In some possible implementations, the communication module 1002 is further configured to:
  obtain, from the metadata storage area of the archive storage, file system metadata of the second target file and a correspondence between the second target file and a plurality of container objects that store the second target file;

The apparatus 1000 further includes:
  an updating module 1006, configured to update, based on the second data, the file system metadata of the second target file and the correspondence between the second target file and the plurality of container objects that store the second target file;

The communication module 1002 is further configured to:
  write updated file system metadata of the second target file and an updated correspondence between the second target file and the plurality of container objects that store the second target file into the backup storage.

In some possible implementations, the backup storage and the backup server are disposed in an integrated manner and the backup storage and the archive storage are disposed separately.

In some possible implementations, the first format is block storage or file storage, and the second format is object-based storage.

The data processing apparatus 1000 according to this embodiment of this application may correspondingly perform the method described in embodiments of this application, and the foregoing and other operations and/or functions of the modules/units of the data processing apparatus 1000 are respectively used to implement method steps performed by the backup server 402 in embodiments shown in FIG. 6A and FIG. 6B to FIG. 9. For brevity, details are not described herein again.

An embodiment of this application further provides a backup server 402. The backup server 402 may be a cloud server in a cloud environment, an edge server in an edge environment, or a local server in a local data center. The backup server 402 is specifically configured to implement a function of the data processing apparatus 1000 in the embodiment shown in FIG. 10.

Refer to a schematic diagram of a structure of the backup server 402 shown in FIG. 5A or FIG. 5B. The backup server 402 includes a processor 4022, a memory 4024, and a network adapter 4026. The processor 4022, the memory 4024, and the network adapter 4026 may be connected through a bus. The network adapter 4026 is configured to connect to an external device through a network, for example, to an archive storage 404 through the network. In this way, the backup server 402 may exchange data with the archive storage 404 through the network adapter 4026. The memory 4024 is an internal memory. The memory 4024 may include computer-readable instructions. The processor 4022 executes the computer-readable instructions, so that the backup server 402 performs the method steps performed by the backup server 402 in the foregoing embodiment.

Specifically, in a case in which the embodiment shown in FIG. 10 is implemented, and the modules of the data processing apparatus 1000 described in the embodiment of FIG. 10 are implemented by using software, software or program code required for performing functions of the modules in FIG. 5A and FIG. 5B such as the conversion module 1004 and the updating module 1006 are stored in a memory, for example, the memory 4024. The processor 4022 executes program code that corresponds to each module and that is stored in the memory 4024, to perform the data processing method in the foregoing embodiment.

An embodiment of this application further provides a computer-readable storage medium. The computer-readable storage medium may be any usable medium that can be stored by a computing device, or a data storage device, such as a data center, including one or more usable media. The usable medium may be a magnetic medium (for example, a floppy disk drive, a hard disk or a magnetic tape), an optical medium (for example, a DVD), a semiconductor medium (for example, a solid-state drive), or the like. The computer-readable storage medium includes instructions, and the instructions instruct the backup server 402 to perform the foregoing data processing method.

An embodiment of this application further provides a computer program product. The computer program product includes one or more computer instructions. When the computer instructions are loaded and executed on a computing device, all or some of the procedures or functions according to embodiments of this application are generated. The computer instructions may be stored in a computer-readable storage medium, or may be transmitted from one computer-readable storage medium to another computer-readable storage medium. For example, the computer instructions may be transmitted from a website, a computing device, or a data center to another website, computing device, or data center in a wired (for example, a coaxial cable, an optical fiber, or a digital subscriber line (DSL)) or wireless (for example, infrared, radio, or microwave) manner. The computer program product may be a software installation package. When any one of the foregoing data processing methods needs to be used, the computer program product may be downloaded and executed on the backup server 402.

Descriptions of procedures or structures corresponding to the foregoing drawings have respective focuses. For a part that is not described in detail in a procedure or structure, refer to related descriptions of other procedures or structures.

What is claimed is:

1. A data processing method, wherein the method comprises:
   receiving, by a backup server from a host computer, a metadata obtaining command, wherein the metadata obtaining command is used to obtain file system metadata in a first format, and the metadata obtaining command comprises an identifier of a to-be-read target directory;
   obtaining, by the backup server from a metadata storage area of an archive storage based on the identifier of the target directory, file system metadata that is in a second format and that corresponds to the target directory, wherein the metadata storage area stores metadata in a centralized manner;
   converting, by the backup server, the file system metadata that is in the second format and that corresponds to the target directory into file system metadata that is in the first format and that corresponds to the target directory, wherein the file system metadata comprises at least one of a subdirectory list or a file list of the target directory, and the file system metadata that is in the second format comprises a plurality of data objects that store partial data of the file system metadata, wherein the converting the file system metadata in the second format comprises combining the plurality of data objects to form continuous data and converting the formed continuous data to the first format; and
   returning, by the backup server to the host computer, the file system metadata that is in the first format and that corresponds to the target directory, wherein the file system metadata comprises at least one of a subdirectory list or a file list of the target directory.

2. The method of claim 1, wherein the method further comprises:
   receiving, by the backup server, a first data read command used to read first data, wherein the first data belongs to a first target file in the target directory, and the first data read command comprises an identifier of the first target file and an address of the first data;
   obtaining, by the backup server from the archive storage, a correspondence between the first data and a plurality of container objects in the archive storage based on the identifier of the first target file and the address of the first data, wherein the plurality of container objects each store partial data of the first data;
   obtaining, by the backup server, corresponding data from the plurality of container objects based on the correspondence, and obtaining the first data based on a plurality of pieces of data obtained from the plurality of container objects; and
   returning, by the backup server, the first data.

3. The method of claim 2, wherein the method further comprises:
   writing, by the backup server, the first data into a backup storage.

4. The method of claim 3, wherein the method further comprises:
   receiving, by the backup server, a second data read command used to read the first data;
   obtaining, by the backup server, the first data from the backup storage; and
   returning, by the backup server, the first data.

5. The method of claim 1, wherein the method further comprises:
   receiving, by the backup server, a data write command used to write second data, wherein the second data is update data of a second target file in the target directory; and
   writing, by the backup server, the second data into a backup storage of the data write command.

6. The method of claim 5, wherein the method further comprises:
   obtaining, from the metadata storage area of the archive storage, file system metadata of the second target file and a correspondence between the second target file and a plurality of container objects that store the second target file;
   updating, based on the second data, the file system metadata of the second target file and the correspondence between the second target file and the plurality of container objects that store the second target file; and
   writing updated file system metadata of the second target file and an updated correspondence between the second target file and the plurality of container objects that store the second target file into the backup storage.

7. The method of claim 3, wherein the backup server and the backup storage are disposed in an integrated manner, and the backup server and the archive storage are disposed separately.

8. The method of claim 1, wherein the first format is file storage or block storage.

9. A backup server, wherein the backup server comprises at least one processor and a memory, the memory stores computer-readable instructions, and the at least one processor executes the computer-readable instructions to cause the backup server to perform operations comprising:
   receiving a metadata obtaining command from a host computer, wherein the metadata obtaining command is used to obtain file system metadata in a first format, and the metadata obtaining command comprises an identifier of a to-be-read target directory;
   obtaining from a metadata storage area of an archive storage based on the identifier of the target directory, file system metadata that is in a second format and that corresponds to the target directory, wherein the metadata storage area stores metadata in a centralized manner;
   converting the file system metadata that is in the second format and that corresponds to the target directory into file system metadata that is in the first format and that corresponds to the target directory, wherein the file system metadata comprises at least one of a subdirectory list or a file list of the target directory, and the file system metadata that is in the second format comprises a plurality of data objects that store partial data of the file system metadata, and wherein the converting the file system metadata in the second format comprises combining the plurality of data objects to form continuous data and converting the formed continuous data to the first format; and
   returning, to the host computer, the file system metadata that is in the first format and that corresponds to the target directory, wherein the file system metadata comprises at least one of a subdirectory list or a file list of the target directory.

10. The backup server of claim 9, wherein the operations further comprise:
receiving a first data read command used to read first data, wherein the first data belongs to a first target file in the target directory, and the first data read command comprises an identifier of the first target file and an address of the first data;
obtaining from the archive storage, a correspondence between the first data and a plurality of container objects in the archive storage based on the identifier of the first target file and the address of the first data, wherein the plurality of container objects each store partial data of the first data;
obtaining corresponding data from the plurality of container objects based on the correspondence, and obtaining the first data based on a plurality of pieces of data obtained from the plurality of container objects; and
returning the first data.

11. The backup server of claim 10, wherein the operations further comprise:
writing, by the backup server, the first data into a backup storage.

12. The backup server of claim 11, wherein the operations further comprise:
receiving a second data read command used to read the first data;
obtaining the first data from the backup storage; and
returning the first data.

13. The backup server of claim 9, wherein the operations further comprise:
receiving, by the backup server, a data write command used to write second data, wherein the second data is update data of a second target file in the target directory; and
writing the second data into a backup storage of the data write command.

14. The backup server of claim 13, wherein the operations further comprise:
obtaining, from the metadata storage area of the archive storage, file system metadata of the second target file and a correspondence between the second target file and a plurality of container objects that store the second target file;
updating, based on the second data, the file system metadata of the second target file and the correspondence between the second target file and the plurality of container objects that store the second target file; and
writing updated file system metadata of the second target file and an updated correspondence between the second target file and the plurality of container objects that store the second target file into the backup storage.

15. The backup server of claim 11, wherein the backup server and the backup storage are disposed in an integrated manner, and the backup server and the archive storage are disposed separately.

16. The backup server of claim 9, wherein the first format is file storage or block storage.

17. One or more non-transitory computer-readable media storing computer instructions, that when executed by one or more processors, cause a computer to perform operations comprising:
receiving a metadata obtaining command from a host computer, wherein the metadata obtaining command is used to obtain file system metadata in a first format, and the metadata obtaining command comprises an identifier of a to-be-read target directory;
obtaining from a metadata storage area of an archive storage based on the identifier of the target directory, file system metadata that is in a second format and that corresponds to the target directory, wherein the metadata storage area stores metadata in a centralized manner;
converting the file system metadata that is in the second format and that corresponds to the target directory into file system metadata that is in the first format and that corresponds to the target directory, wherein the file system metadata comprises at least one of a subdirectory list or a file list of the target directory, and the file system metadata that is in the second format comprises a plurality of data objects that store partial data of the file system metadata, and wherein the converting the file system metadata in the second format comprises combining the plurality of data objects to form continuous data and converting the formed continuous data to the first format; and
returning, to the host computer, the file system metadata that is in the first format and that corresponds to the target directory, wherein the file system metadata comprises at least one of a subdirectory list or a file list of the target directory.

18. The one or more non-transitory computer-readable media of claim 17, wherein the operations further comprise:
receiving a first data read command used to read first data, wherein the first data belongs to a first target file in the target directory, and the first data read command comprises an identifier of the first target file and an address of the first data;
obtaining from the archive storage, a correspondence between the first data and a plurality of container objects in the archive storage based on the identifier of the first target file and the address of the first data, wherein the plurality of container objects each store partial data of the first data;
obtaining corresponding data from the plurality of container objects based on the correspondence, and obtaining the first data based on a plurality of pieces of data obtained from the plurality of container objects; and
returning the first data.

19. The one or more non-transitory computer-readable media of claim 18, wherein the operations further comprise:
receiving a second data read command used to read the first data;
obtaining the first data from a backup storage; and
returning the first data.

20. The one or more non-transitory computer-readable media of claim 17, wherein the operations further comprise:
receiving a data write command used to write second data, wherein the second data is update data of a second target file in the target directory; and
writing the second data into a backup storage of the data write command.

* * * * *